(12) United States Patent
Uy et al.

(10) Patent No.: US 9,548,781 B2
(45) Date of Patent: Jan. 17, 2017

(54) ENABLING PRE-PROVISIONED PROPRIETARY CARRIER-SPECIFIC FEATURE SERVICES AND APPLICATIONS FOR EXECUTION ON A MOBILE DEVICE

(71) Applicant: Verizon Patent and Licensing Inc., Arlington, VA (US)

(72) Inventors: Warren Hojilla Uy, Randolph, NJ (US); Mary Williams, Miltona, MN (US); Taussif Khan, Monroe, NJ (US); Siegfried Erhard Eichinger, West Chester, PA (US); Manuel Enrique Caceres, Basking Ridge, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 112 days.

(21) Appl. No.: 14/457,896

(22) Filed: Aug. 12, 2014

(65) Prior Publication Data

US 2016/0049975 A1   Feb. 18, 2016

(51) Int. Cl.
*H04B 1/38* (2015.01)
*H04B 1/3816* (2015.01)
*H04W 8/20* (2009.01)
*H04W 8/18* (2009.01)
*H04W 4/00* (2009.01)
*H04W 8/22* (2009.01)

(52) U.S. Cl.
CPC ........... *H04B 1/3816* (2013.01); *H04W 8/205* (2013.01); *H04W 4/001* (2013.01); *H04W 8/183* (2013.01); *H04W 8/22* (2013.01)

(58) Field of Classification Search
CPC ........ H04W 8/18; H04W 8/183; H04W 8/265; H04W 4/001
USPC .............................. 455/425, 432.3, 557, 558
See application file for complete search history.

(56) References Cited

U.S. PATENT DOCUMENTS

| | | | |
|---|---|---|---|
| 2001/0001875 A1* | 5/2001 | Hirsch | H04M 1/72563 713/1 |
| 2007/0167161 A1* | 7/2007 | Cheng | H04W 8/265 455/435.1 |
| 2009/0093233 A1* | 4/2009 | Chitlur | G08B 13/1409 455/411 |
| 2009/0181662 A1* | 7/2009 | Fleischman | H04W 4/001 455/419 |
| 2010/0274930 A1* | 10/2010 | Thakkar | H04W 36/385 710/8 |
| 2010/0311444 A1* | 12/2010 | Shi | H04W 4/003 455/466 |

(Continued)

*Primary Examiner* — Duc M Nguyen

(57) ABSTRACT

A pre-provisioned mobile device and a system are provided that enables selection of proprietary feature services and proprietary applications specific to one cellular carrier from among two or more cellular carriers that have pre-provisioned the mobile device with carrier-specific proprietary feature services and proprietary applications. In response to insertion of a carrier-specific universal integrated circuit card, pre-provisioned proprietary feature services and proprietary applications specific to the carrier associated with the carrier-specific universal integrated circuit card are enabled for execution on the mobile device from a memory of the mobile device. Other examples allow for customized firmware and software builds.

20 Claims, 8 Drawing Sheets

(56) References Cited

U.S. PATENT DOCUMENTS

| | | | | |
|---|---|---|---|---|
| 2011/0028135 A1* | 2/2011 | Srinivasan | H04M 3/42382 | 455/415 |
| 2011/0086670 A1* | 4/2011 | Shin | H04W 8/205 | 455/558 |
| 2012/0108295 A1* | 5/2012 | Schell | H04W 4/001 | 455/558 |
| 2012/0264400 A1* | 10/2012 | Khan | H04L 63/0876 | 455/411 |
| 2013/0184029 A1* | 7/2013 | Lim | G06F 9/4448 | 455/551 |
| 2014/0106728 A1* | 4/2014 | Aboulhosn | H04W 8/205 | 455/418 |
| 2014/0213233 A1* | 7/2014 | Parry | H04W 8/245 | 455/418 |
| 2015/0186621 A1* | 7/2015 | Uy | G06F 21/10 | 726/26 |

* cited by examiner

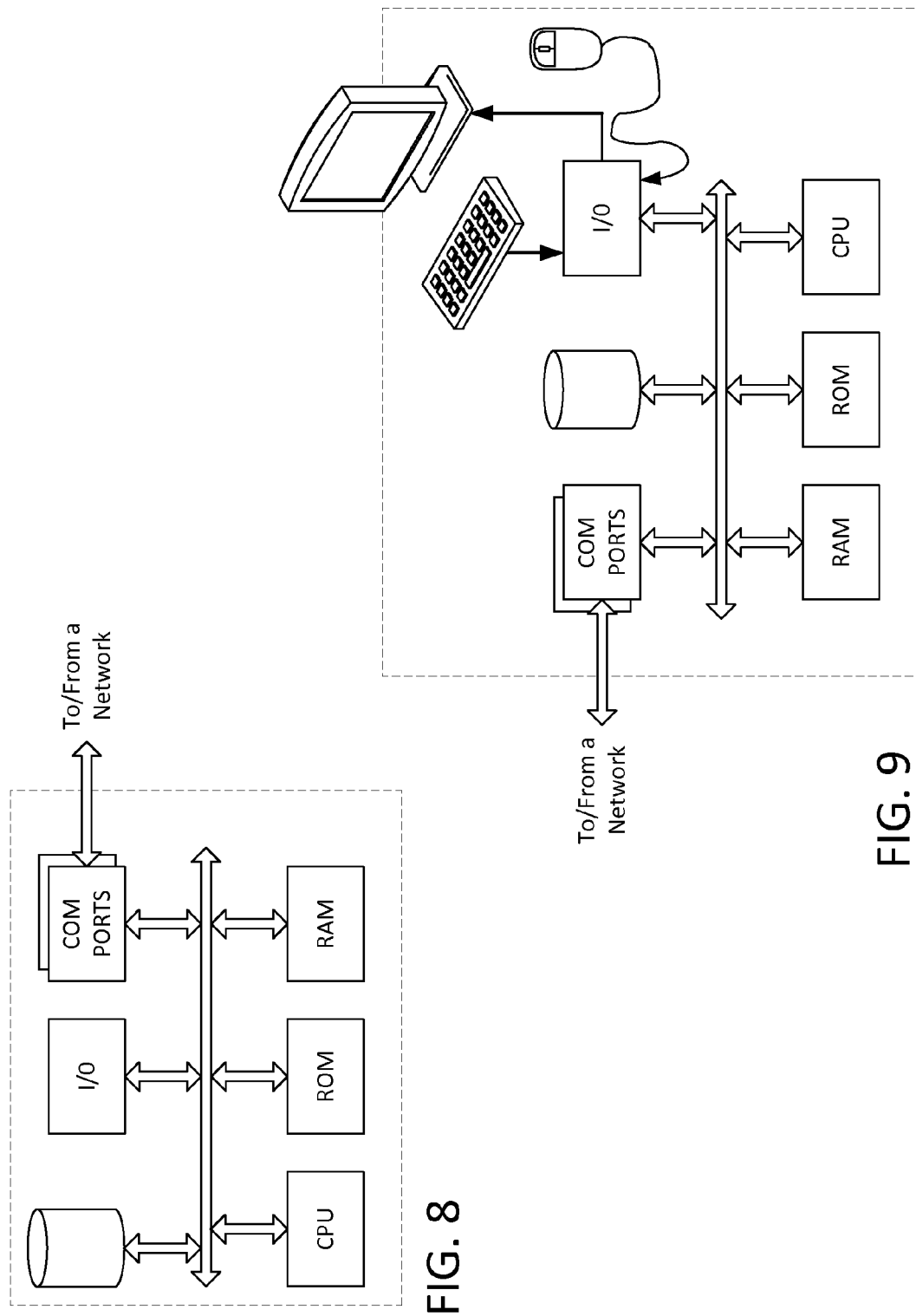

ENABLING PRE-PROVISIONED PROPRIETARY CARRIER-SPECIFIC FEATURE SERVICES AND APPLICATIONS FOR EXECUTION ON A MOBILE DEVICE

BACKGROUND

Today, cellular service uses a subscription model under which users subscribe to a cellular service provided by a particular cellular carrier. If a subscriber also obtains their mobile device from the particular cellular carrier, carrier-specific applications, logos and feature services associated with the particular cellular carrier are provided with the mobile device. These cellular carrier-specific applications and feature services may provide a number of different features to the subscribers, such as navigation, bill payment, a family locating feature, lost device location or erase, music services, and the like. The software that provides the applications and feature services is typically proprietary to, or for exclusive use by, the particular cellular carrier.

In addition, the particular cellular carrier may partner with other carriers, and provide yet one or more other branded applications for the partnership. The partnership-branded device may have different features than the particular cellular carrier branded device. In other words, the particular cellular carrier may be associated with a number of branded devices that are the same model and from the same manufacturer but that have different requirements.

Moreover, other mobile devices, (e.g., open devices, "jail-broken" devices "rooted" devices or unlocked devices) that are not obtained through a cellular carrier, but from, for example, a mobile device manufacturer, or third parties, are classified as non-branded devices. Non-branded devices only contain base software. Base software is the minimum, or almost the minimum (there may be some features that are needed for only communicating or using a feature of the phone such as a notes application or a voice recording application) software needed to perform functions typically associated with a mobile device, such as voice calling, e-mailing, text messaging, camera control and the like.

Since the branded and non-branded devices have different capabilities with regard to a particular cellular carrier and the cellular carrier's network, the cellular carrier must provide device manufacturers with requirements documents for each type of device. In addition, the device manufacturers must provide each of the different cellular carriers with different versions of the same device to meet the requirements of each cellular carrier.

Hence, although to the public, the devices may appear or be marketed as the same model, from the perspectives of the manufacturer and the carriers, the devices actually may be several models or versions that are similar but differ as to the software loads. Thus, the sets of features and/or applications installed or activated on the different carrier's version(s) of the mobile device require the manufacture of different versions of the same mobile device model. Accordingly, there is a need to minimize the number of different mobile device versions of the same mobile device model that need to be generated to meet the requirements of the different carriers.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 8 is a simplified functional block diagram of a computer that may be configured as a host or server, for example, to function as a server in the system of FIG. 5.

FIG. 9 is a simplified functional block diagram of a personal computer or other work station or terminal device.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples of a pre-provisioned device customization service disclosed herein relate to a mobile device that is pre-provisioned with proprietary feature services and application for a number of different cellular carriers. The proprietary feature services and application for a number of different cellular carriers are maintained in a secure memory, and specific proprietary feature services and applications are enabled for use on a mobile device as described in the following examples. "Enabled" proprietary feature services and applications means that the feature services and applications are selected, activated, or otherwise, made executable by the mobile device processor or operable on the mobile device.

Reference now is made in detail to the examples illustrated in the accompanying drawings and discussed below.

Figure 1:
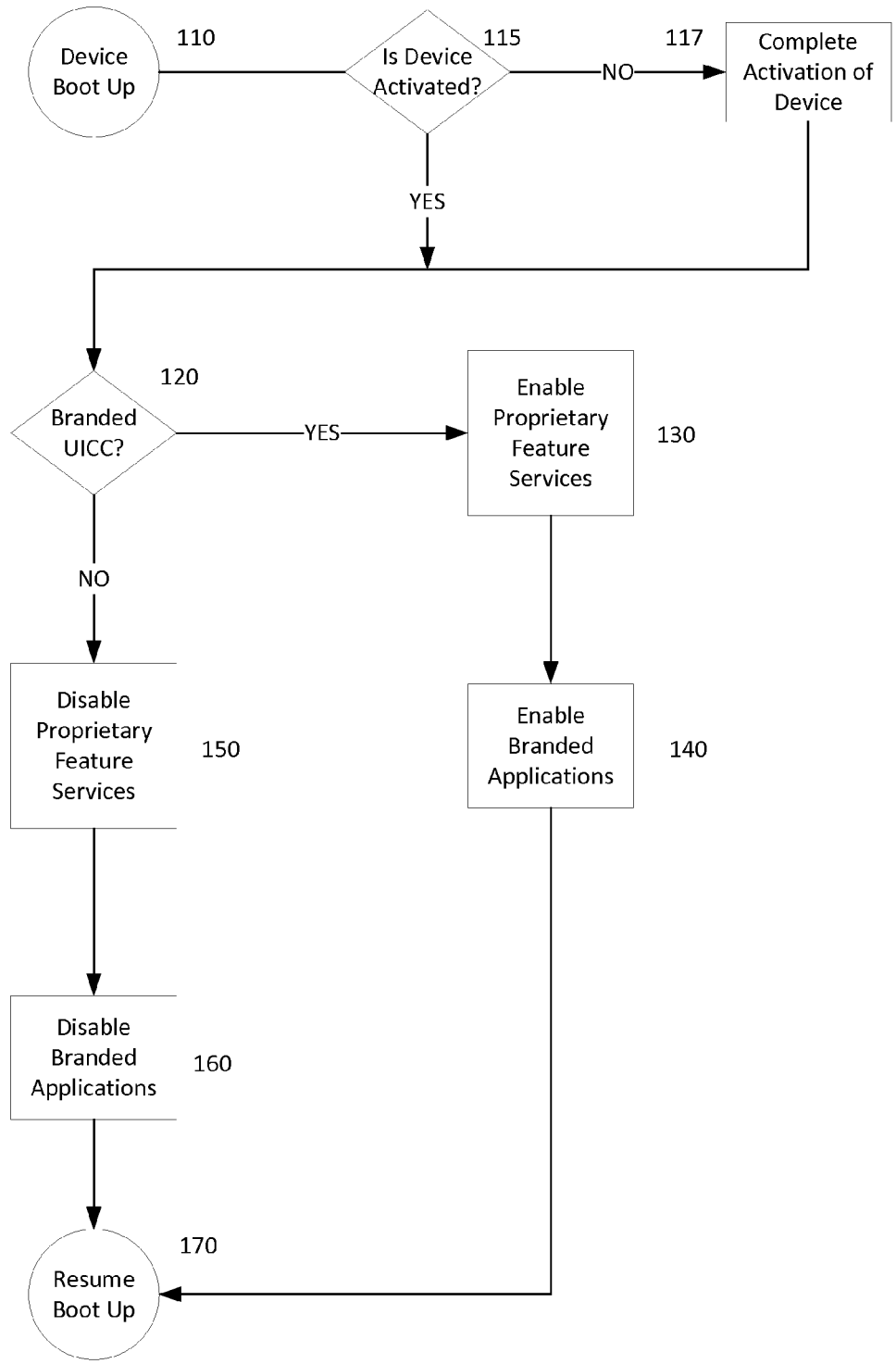
FIG. 1 illustrates the example of a mobile device process in which the mobile device is pre-provisioned with proprietary feature services and applications from multiple carriers, and enables one carrier's proprietary feature services and applications for execution on the mobile device.

FIG. 1 illustrates the example of a boot up device configuration process for determining the customization that is to be applied to mobile device. Prior to the boot up device configuration process that is about to be described, a user may have created a subscriber account with a cellular carrier who has provided the user with a UICC for use with the user's mobile device. For example, using a personal computer, through a pre-existing account or via a carrier in-store visit, the user may establish a subscriber account. The mobile device may not yet be activated on the network and may perform common steps for self-activation. The mobile device (described in more detail with reference to FIGS. 2-6) has a UICC inserted into the appropriate interfaces of the mobile device.

The process 100 begins with a boot up sequence 110 of a mobile device having a UICC installed in the mobile device. The mobile device processor detects the insertion of the UICC into an interface of the mobile device. The detection may be performed by a program or agent, such as a base feature service or the like, executing on the mobile device processor and that receives inputs from the interface. In an example, upon a detection of the insertion of the UICC into mobile device interface, the processor reads data from a memory of the UICC. At 120, a determination is made whether a Universal Integrated Circuit Card (UICC) inserted into the mobile device is a branded UICC. Whether the UICC is a branded may be determined using a number of different methods. For example, a mobile device processor may access a file in the UICC that contains a number of different values. An example of or information contained in such a file is illustrated in Table 1 below. At least one of the values, such as the Group ID (also called a GID1 or GID2), indicates whether the UICC is from a particular carrier or a partnership of particular carriers. In the present example, each individual UICC is programmed with a unique identifier value that corresponds to a specific cellular carrier. The unique identifier is stored in a file with other information on the UICC. Each of the different cellular carriers provides their own UICC cards that indicate to the original equipment manufacturers (OEM) of the mobile devices the identity of the particular cellular carrier providing the UICC. In addition the UICC may be pre-provisioned, but only for restricted service sufficient to enable self-activation.

In an example, a UICC may be inserted into a UICC interface of a mobile device. As mentioned in the preceding paragraph, a UICC is programmed with an identifier value that corresponds to a specific cellular carrier. The identifier may be usable to identify the UICC and the UICC supplier (typically a cellular carrier). In an example, the identifier is stored in a file on the particular UICC, the mobile device processor may retrieve the identifier from the UICC file, and compare the retrieved identifier to a list of UICC and cellular carrier information stored in a mobile device memory. The list may take a form as shown in Table 1 below. In an example, the UICC identifier retrieved from the UICC file is a Group ID number, and using the Group ID number (GID), the mobile device processor may traverse through the list until a match is found. For example Table 1 indicates that a Group ID of TAE000000000 indicates that the UICC belongs to Carrier XYZ, a Group ID of JAE000000011 indicates Carrier AWS, while other values may indicate, for example, Carrier XYZ partners A-BEL or C9. The different carriers, such as Carrier XYZ, may have agreements with one or more mobile device manufacturers for installing Carrier XYZ proprietary feature services and applications when the mobile devices are manufactured. The identifier file stored in a memory of the UICC includes information, such as that shown in Table 1 below, regarding the UICC and the UICC supplier (typically a cellular carrier). For example, as illustrated in Table 1 above, one value is a group identifier (e.g., GID1) value. In the example, the GID1 value is TAE000000000, which corresponds to Carrier XYZ. In response, the mobile device processor determines that the UICC is specific to Carrier XYZ. The list stored on the mobile device, in some examples, includes additional information (e.g., availability, location in memory or server address, data size and the like) regarding pre-provisioned base software (e.g., base feature services or base applications), proprietary feature services, branded applications and the like. This additional information is, in some examples, used during the process 100 for enabling or disabling the respective pre-provisioned feature services and branded applications.

TABLE 1

| UICC Classification | Base software | Proprietary feature services | Branded applications | Group ID (GID1 or GID2) | Carrier |
| --- | --- | --- | --- | --- | --- |
| Branded | Yes | Yes | Yes | TAE000000000 | Carrier XYZ |
| Branded | Yes | Yes | Yes | JAE000000011 | Carrier AWS |
| Non-Branded | Yes | No | No | Other values | Carrier XYZ Partners (e.g., A-BEL, C9, etc.), Open devices |

Returning to the process flow of FIG. 1, step 120, in response to a "YES, the UICC is a branded UICC" determination at 120, the process 100 proceeds to step 130 at which the mobile device processor (shown in another example) enables the proprietary feature services on the mobile device that correspond to the brand of the UICC. For example, the mobile device processor identifies pre-provisioned proprietary feature services and proprietary applications corresponding to the specific cellular carrier of the branded UICC in a memory of the mobile device containing pre-provisioned proprietary feature services and proprietary applications corresponding to a number of cellular carriers.

Although the trigger to determine whether to activate proprietary content (i.e., proprietary feature services and branded applications) is described with respect to a determination of whether the UICC is branded or not, the determination of whether the device has a branded UICC may also be based other methods, for example, the user signing into a web portal, subscribing to a service in a carrier store, or the like.

The different OEM mobile devices may include programming, executed based on commands from the operating system (OS) of the respective mobile devices that causes installation of different types of branded feature services from the memory of the device. For example, the programming causes the processor to access a memory in the mobile device that contains files related to the branded features, and transfer the files to another portion of memory which is accessed by the processor when attempting to provide the feature services. In another example, the processor when enabling the proprietary feature services or the branded applications, for example, may change a setting in the boot up procedure which indicates that the memory addresses for the installation files or files that are to be accessed in order to load the respective feature services or branded applications when booting up.

Non-branded devices may be devices that utilize cellular carrier networks of partners of the larger "branded" cellular carriers. In other words, similar to an open device, these "non-branded" devices may not be provided with any proprietary feature services or proprietary software. Non-branded devices and open devices may be manufactured independent of any requirements from a specific cellular carrier or group of cellular carriers.

Examples of this processor action and others will be described in more detail with respect to FIG. 2.

After installation of the proprietary feature services, the process 100 proceeds to step 140. At step 140, similar to step 130 above, the processor enables, if any, branded applications on the mobile device based on the read value, such as GID1 value TAE000000000. After the branded applications are enabled on the mobile device, the process 100 proceeds to 170 where boot up resumes. After boot up completes, the mobile device is configured to provide the proprietary feature services and branded applications on the mobile device. This and other examples of the processor action will be described with respect to FIG. 2.

Returning to step 120, at which a "NO" determination is made regarding whether the UICC is a branded UICC. In this case, the process 100 proceeds to step 150 at which the mobile device processor disables any proprietary feature services on the mobile device. After disabling any proprietary feature services on the mobile device, the process 100 proceeds to 160 where the mobile device processor disables any branded applications.

In an example, the processor when disabling the proprietary feature services or the branded applications, for example, may change a setting in the boot up procedure which indicates that the memory addresses for the installation files or files that are accessed in order to load the respective proprietary feature services or proprietary (i.e. branded) applications are to be bypassed or ignored by the processor when booting up. In some examples, the disabled cellular carrier proprietary feature services and proprietary applications (of a specific former cellular carrier or first cellular carrier) in a memory location inaccessible to the user or a subsequent (i.e., another or second) cellular carrier.

Alternatively, the previously enabled proprietary feature services and branded applications are deleted. Any personal data generated by the proprietary feature services of the branded applications may be deleted from the mobile device, stored on the mobile device accessible only via the respective proprietary feature service or branded application that is permitted access to the information (e.g., subscriber account information, or branded application account information), stored (perhaps temporarily) on a database server (of the cellular carrier) for future use, or stored in a memory either on the mobile device or at a web address for access by the user at any time. For example, an agent on the device may convert the generated data into a common format usable by most non-proprietary applications or base feature services.

Upon resumption of the boot up procedure at 170, and during an ensuing first data communication, the cellular communication network device with which the mobile device is communicating allows equipment of the cellular network provider to obtain sufficient information so that use of a cellular network can be permitted to operate within the network and be billed. During the ensuing device boot up sequence, the customization of the device and provisioning of the device is completed.

As described in more detail with reference to FIG. 5, during later data communications, a cellular carrier (i.e., network provider) permits use of the cellular communication network (i.e., mobile traffic network in later examples) and bills for that use accordingly. Use the words "billed" and "bills" encompassed various plans for prepayment for service, postpayment for service, as well as any combination of prepayment and postpayment.

In order to implement the above examples described above, software architecture has been developed that enables the dynamic content of proprietary information to be transferred across carriers. FIG. 2 illustrates an example of software architecture for implementing the pre-provisioned device customization described herein.

The software architecture 200 includes code related to applications 210, user interfaces 220, middleware 230 and a kernel 240. The applications 210 include proprietary applications 215 and non-proprietary and downloaded applications 217. The user interfaces 220 include proprietary user interfaces 221 and non-proprietary user interfaces 227. The middleware 230 includes basic feature services 233, proprietary feature services 235, and libraries 237. The kernel 240 includes device drivers, security information and algorithms, protocol stack, memory management, power management and the like.

Of the applications 210, the proprietary applications 215 are the branded applications referred to above in FIG. 1. The proprietary applications 215 include applications related to a particular cellular carrier. As mentioned above, the proprietary applications, for example, such as applications App1, App2 . . . AppN (where N is an integer), may be applications such as navigation, hands-free calling, dialing assistance or the like. These proprietary applications are enabled/disabled based on instructions from the mobile device processor. As will be described in more with reference to FIG. 5, the mobile device may have a memory location dedicated for storing the proprietary application as well as for storing any non-proprietary applications and downloads 217. The non-proprietary applications and downloads 217 may include non-proprietary applications N-app 1, N-app 2 . . . N-app N, where N is an integer. Non-proprietary applications may be applications such as games, productivity applications, news applications or any application that is not owned or managed by a cellular carrier. The non-proprietary applications and downloads are stored in a memory location (represented by 217) of the memory unaffected by the enabling and disabling of the proprietary feature services or proprietary applications of the first or second cellular carrier.

In some examples, the user interface 220 has proprietary 221 and non-proprietary user interfaces 227. The proprietary user interfaces (PUI) 221, in the example, are specific to the respective cellular carriers. For example, the PUI 221 may present a carrier logo(s) and/or a message(s) related to the respective cellular carrier. A logo for the XYZ Carrier, for example, may be a stylized XYZ or the like. The logo may be presented on the display device of the mobile device when the mobile device is in idle mode or upon start up, or may be presented on the backside of the mobile device. The display of the logo on the backside of the mobile device will be described in more detail with respect to FIG. 7. Similarly, the proprietary messages 221 may provide messages relevant to the respective carrier. Meanwhile, the non-proprietary user interface elements (NPUI) 227 may provide messages for the basic operation of the mobile device or for use with non-proprietary applications, such as a game or the like.

Middleware 230 provides feature services (basic 233 and proprietary 235) and libraries 237 that are more closely integrated with the operating system (OS) of the mobile device. In other words, the OS interacts with these feature services and libraries to provide functionality that is more closely integrated with the operation of the mobile device than the applications 210. "Closely integrated" means that a respective feature service may operate even when a user has not selected an icon for active interaction with the respective feature service, while a library is typically unavailable for interaction by the user other than perhaps some settings (e.g., selection of data storage settings, selection of default browser, parental controls for multimedia, or the like). However, in response to commands from the processor via the OS, different feature services may be provided to the user based on the triggering event (e.g., insertion of UICC or settings made via a web interface) for personalizing the pre-provisioned mobile device.

Generally, the kernel 240 provides functions, such as device drivers (e.g., Bluetooth headsets, keyboards, headphones and the like), protocol stack management, memory management (e.g., allocating memory for use by applications 210, power management and the like, that allow for operation of the mobile device. In some examples, the kernel 240 is responsible for receiving inputs that change the brightness on a mobile device, accepting other inputs and outputs for changing functions and the like. While the applications 210, the user interface 220, and different proprietary feature services 235 may be provided based on the respective trigger, the kernel 240 is largely unaffected in response to the trigger, e.g., a user's web page information or whether the UICC is branded or unbranded.

Figure 2:
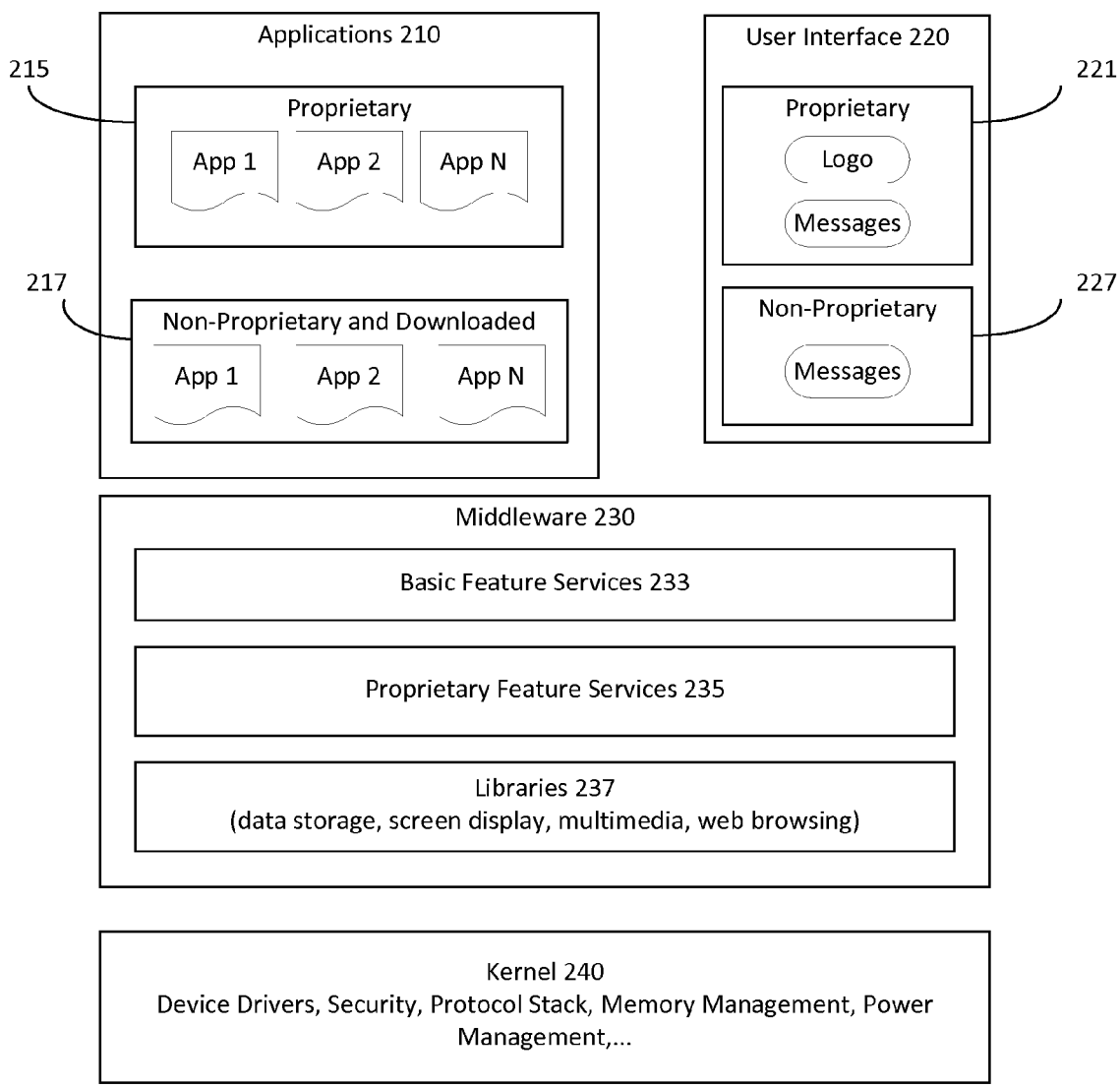
FIG. 2 illustrates an example of a software architecture for implementing the pre-provisioned device customization described herein.

The architecture of FIG. 2 allows for life cycle management of the device. The above segregation of proprietary feature services and applications from non-proprietary feature services and applications allows for extended use of the mobile device by a user beyond using the device with a single cellular carrier. In other words, in the past, a device from a first cellular carrier may not be usable with a second cellular carrier. In which case, the user's proprietary applications and any data generated therefrom may be lost (e.g., a proprietary e-mail and e-mail contacts of the first cellular carrier may be lost when the user transitions to a second cellular carrier) or very difficult to retrieve when the mobile device was provisioned into a subsequent cellular carrier network.

According to the present examples, a manufacturer of the mobile device 104 may have agreements with a number of large cellular carriers that, for example, have millions of subscribers each. Each of the large cellular carriers may have proprietary feature services and proprietary applications. Each mobile device (for example, of a particular model) manufactured by the manufacturer may have proprietary feature services and proprietary software pre-installed on the mobile device at time of manufacture. Each carrier's proprietary feature services and proprietary software, according to the described examples, are stored in a secure memory on the mobile device, for example, in a memory secured by some form of encryption and/or security keys, and partitioned from one another as discussed above with reference to FIG. 2.

Figure 3:
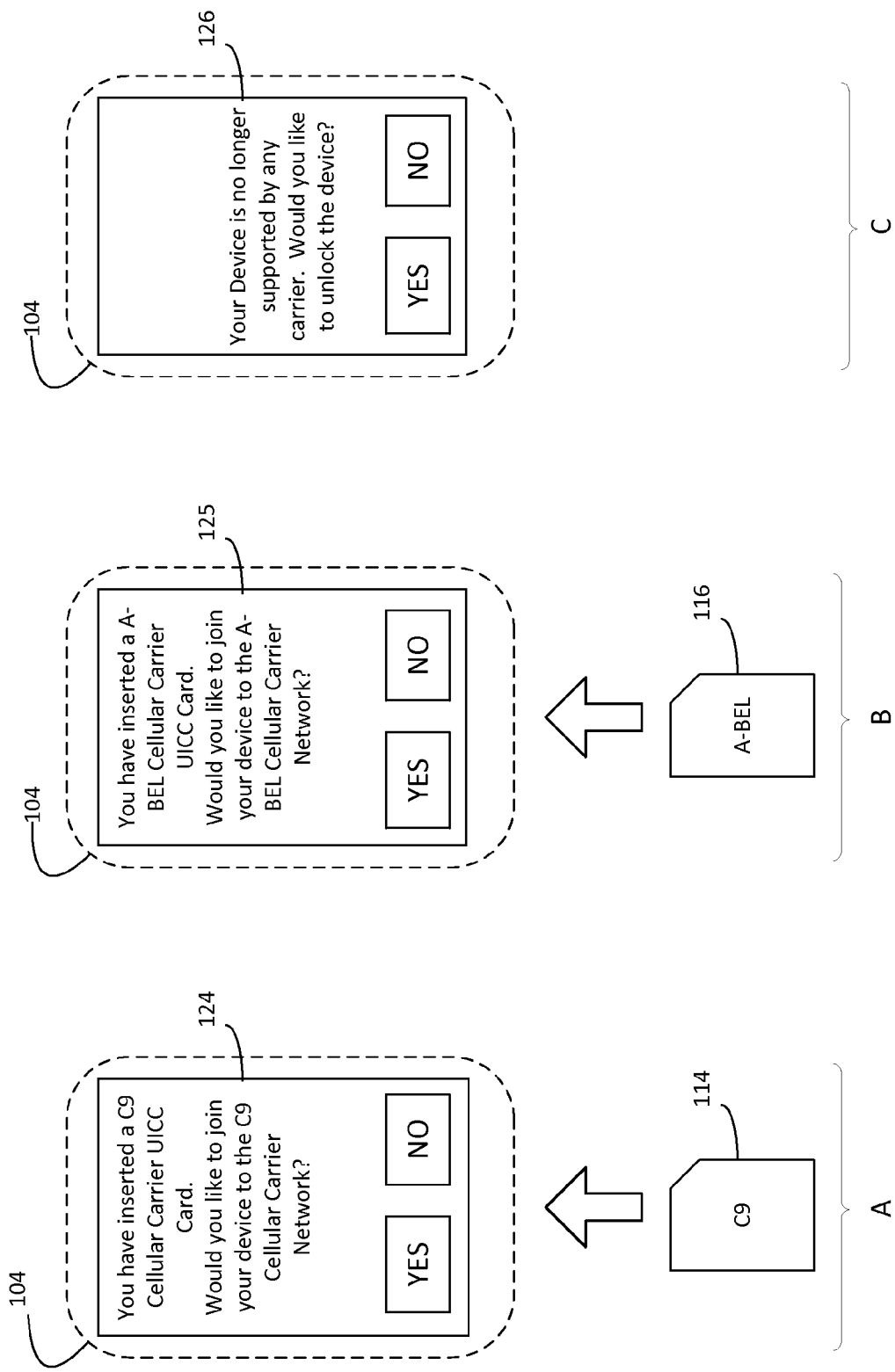
FIG. 3 illustrates an example of a use case in which examples of the pre-provisioned device customization service for enabling pre-provisioned proprietary feature services and application may be utilized.

FIG. 3 illustrates an example of different phases of a device life cycle. For example, View A indicates the first provisioning of a mobile device 104 with a first cellular carrier, for example, Carrier C9, according to the process described with respect to FIG. 1. Upon insertion of a C9 branded UICC 114 into the mobile device 104, the mobile device 104 processor (not shown in this example) begins a boot-up sequence (e.g., 110 of FIG. 1), and identifies (as described above) the UICC 114 as a UICC branded for Carrier C9 (e.g., 120 of FIG. 1). In response to the identification of the branded UICC, the mobile device 104 processor causes a prompt, as shown in View A, to be presented confirming the user's intent to join the Carrier C9 network to be presented on the display device 124, which may also be a touchscreen, of the mobile device 104. In response to the presentation of the prompt, the mobile device 104 receives an input, for example, via the display device 124, confirming the user's intent to join the Carrier C9 network. In response to the received confirmation, the mobile device processor initiates the base feature services of the mobile device, which may include identifying proprietary feature services that correspond to the Carrier C9. The Carrier C9 proprietary feature services are also enabled. One of the base or proprietary feature services may be responsible for accessing the mobile device memory and installing the proprietary software applications based on the GID1 number read from the UICC. The mobile device processor also configures the libraries in the middleware 230 according to the GID1 number. For example, the memory allocations of the proprietary software applications and/or the protocol stack for the respective proprietary feature services are set by the processor.

In addition, the processor by executing program instructions stored in the mobile device memory also configures the user interface of the mobile device according to the GID1 number as well. The proprietary user interface 221 includes proprietary messages and also provides graphical user interfaces according to the proprietary software and feature services that include a logo specific to the cellular carrier (i.e., Carrier C9). Upon enablement of the proprietary feature services and proprietary software, the mobile device continues with the boot up process (e.g., 170 of FIG. 1) after which the mobile device will be provisioned in the C9 cellular network.

Once the mobile device 104 is provisioned in the C9 cellular carrier network, the subscriber/user may generate data that is specific to the user that is stored on the mobile device or in a database (i.e. in the network storage associated with the user subscription to the C9 cellular carrier network). For example, according to the software architecture shown in FIG. 2, the proprietary applications 215 with any personal data generated therefrom may be stored in a memory of the mobile device 104. In a specific example, a proprietary application 215, such as App 1, may be a navigation application, and the personal information generated may include locations of work, home, child's school or the like. For example, both the navigation application and the navigation application personal information are maintained in a memory on the mobile device 104.

Similar to the applications, the feature services that are proprietary to the C9 cellular carrier network are also enabled on mobile device 104, for example, by the activation server. In some examples, the version of the proprietary feature services depends upon the firmware version provided to the mobile device via the OTA activation.

While the mobile device 104 is provisioned to the C9 cellular carrier network, the mobile device 104 user may acquire additional proprietary applications, such as applications exclusive to the C9 cellular carrier, such as the NFL® mobile application that allows the user to view football games, as well as additional non-proprietary applications. With reference to FIG. 2, the proprietary applications 215 may be stored in a different memory location of the mobile device than the non-proprietary applications 217 and related data.

Furthermore, upon activation of the mobile device 104 into a carrier network, such as the C9 cellular carrier network, a C9 proprietary user interface 221 logo is presented on a display device 124 of the mobile device, for example, when the mobile device is turned ON. The logo may be presented in other locations of the device not only when the mobile device is turned ON but when OFF or when in an idle mode. This feature will be described in more detail in the discussion of FIG. 7.

After a time, the user of the mobile device may decide to use another cellular carrier. Or said differently, the user may want to switch to another cellular carrier. The user may decide to subscribe to another cellular carrier for various reasons, such as a better price for mobile communication services, for obtaining cellular services while in a different country, or the like. In view B of FIG. 3, the user has removed the C9 UICC 114, and has inserted the A-BEL cellular carrier UICC 116.

The change from one cellular carrier's UICC (Carrier C9) to another cellular carrier's UICC (Carrier A-BEL) is detected, for example, as discussed with reference to FIG. 1, by a program or agent, such as a base feature service (shown in middleware 230), executing on the processor of the mobile device 104. In either case, the insertion of the A-BEL-branded UICC causes the mobile device 104 processor to access an identifier file in the A-BEL-branded UICC. The mobile device 104 processor reads the GID1 value of the A-BEL-branded identifier file. In response to reading the GID1 value, the processor presents a prompt on the display device 124, for example, confirming whether the user wants to join their mobile device 104 to the A-BEL cellular carrier network.

In response to a confirmation input by the user (such as the selection of the YES button also presented on the display device 124), the mobile device 104 processor disables proprietary feature services and proprietary applications of Carrier C9 as discussed above with reference to element 150 of FIG. 1. For example, applications exclusive to the C9 cellular carrier, such as the NFL® mobile application that allows the user to view football games, are disabled and become inaccessible via the mobile device 104. The disabled proprietary software may be stored or removed from the mobile device. In addition, the state (e.g., disabled versus enabled) of the disabled proprietary software and any proprietary carrier information may be stored in a secure memory of the mobile device, or an "image" of the proprietary software or proprietary carrier information may be stored at a server associated with the cellular carrier, i.e., C9 in this example. As for the non-proprietary applications and downloads, these applications and downloads will be used by the user once the mobile device is switched to the other carrier, and are stored in a memory location of the memory unaffected by the enabling and disabling of the proprietary feature services or proprietary applications of the former (e.g., first) or subsequent (e.g., second) cellular carrier. In the example where the proprietary software is removed from the mobile device 104 and an image of the proprietary software or proprietary carrier information is stored on the cellular carrier C9 server, if the subscriber returns (i.e., re-subscribes) to C9, then the proprietary software or proprietary carrier information is reloaded on the mobile device 104. Similarly, an image of the proprietary software or proprietary carrier information may be stored in the secure memory of the mobile device.

In another example, the C9 cellular carrier-exclusive applications, such as the NFL® mobile application, is permitted (e.g., based on agreements between the cellular carriers) to function on the other cellular carrier networks, and vice versa. In the example, after confirmation of the switch from the C9 cellular carrier to the A-BEL cellular carrier, a menu is presented with the different C9 cellular carrier proprietary applications that may be permitted to operate on the A-BEL cellular carrier network. In response to the user selections, the mobile device is configured (for example, according to either of the processes discussed below) to retain the proprietary applications from the prior cellular carrier (i.e. C9).

Depending upon the manufacturer of the mobile device 104, the mobile device processor either attempts to contact a server associated with the A-BEL-branded UICC or (as shown in FIG. 1) enables proprietary software and proprietary feature services associated with Carrier A-BEL pre-stored on the mobile device 104 by the original equipment manufacturer.

In the former implementation, the mobile device 104 transmits a signal to the A-BEL cellular carrier network. The transmitted signal may be, for example, an activation request. The activation request may include a content address, which identifies mobile device to an activation server at the A-BEL cellular carrier network. In an example, the content address is a uniform resource locator (URL) of the activation server. The activation request also includes, for example, mobile device identification and/or authentication information that is used for authenticating and the subsequent activating of the mobile device on the A-BEL cellular carrier network. Authentication information may be, for example, a UICC serial number, an international mobile subscriber identity (IMSI) number, a mobile device number (MDN), security key information, or the like. This information may also be used as identification information for the mobile device. The activation server (shown in another example) performs identification, authentication and activation functions and services according to known procedures and methods. The activation server may delegate some of the above the identification and authentication functions and services to other components (e.g., servers) of the network.

Upon authentication of the mobile device with the activation server, the mobile device, via a device boot loader or another mobile device system level component, downloads from the activation server or another server, the firmware (that provides or implements the proprietary feature services of the respective carrier) and proprietary software of the respective cellular carrier over-the-air (OTA) to the mobile device 104. For example, the content address received from the UICC may be the indicator of the versions of firmware and/or software that is to be downloaded to the mobile device 104. For example, the particular server pointed to by the content address may provision all devices that connect to the server with the same firmware and proprietary software. The firmware may implement the proprietary feature services of the respective carrier by instructing the processor to perform the services, providing security keys for access to the respective services or the like. In addition, if the user was able to select any proprietary applications of the former cellular carrier (i.e., as explained above with respect to the C9-exclusive NFL application), the former (i.e. first) cellular carrier proprietary application is retained as a fully-functioning application on the mobile device 104 after the mobile devices switches to receiving service from the A-BEL (i.e., second) cellular carrier.

The additional information included in the activation request may indicate the versions of firmware and/or proprietary software that is to be downloaded to the mobile device 104. For example, the additional information (e.g., an international mobile subscriber identity (IMSI) number, a mobile device number (MDN), security key information or the like) may indicate to the activation server indicate the version of the firmware and/or proprietary software that is to be downloaded to the mobile device. In another example, the additional information may be compared to billing information or other network provisioning information to identify firmware and/or proprietary software versions according to the subscription level of the subscriber (i.e., user) of the particular cellular carrier.

Firmware over-the-air (FOTA) activation, however, is typically relatively static, which means that all the devices being provisioned via FOTA are receiving the same version of firmware (and perhaps the same versions of proprietary software). The FOTA distribution is typically, version 1, followed by version 2, followed by version 3 and so on. If a user likes a feature service from version 1, and another from version 2, but finds that the firmware version 3 does away with those particular feature services for some reason while providing a performance upgrade, the user has a dilemma. The user can decide to forego the firmware upgrade to version 3 in order to keep the earlier firmware feature services, or choose the firmware upgrade and do without the earlier firmware feature services. The following example solves the user's dilemma and allows the user to choose their firmware features.

Another example of activating a mobile device with a second cellular carrier after changing from a first cellular carrier is by a process known as firmware-on-demand. Firmware-on-demand is a dynamic build of the firmware and proprietary software of the cellular network (i.e., A-BEL) that the user is going to be subscribed. For example, a user may access an A-BEL cellular carrier network portal or website, and establish a subscriber account via a personal computer, a desktop, tablet or laptop computer, or at a store front associated with A-BEL. A subscriber account may include a user name, a user password, a billing address and other information related to the user. The subscriber account information may be stored in database (not shown) managed by a cellular carrier server, such as one or more of servers 229A or 229B of FIG. 5. Upon the user provisioning a subscriber account with the A-BEL activation server, and/or authentication of the user as a subscriber of A-BEL cellular service, and the user selection of a firmware-on-demand option input via a graphical user interface of the website or portal, a menu of firmware options and software options may be presented to the user via the website or portal. For example, a server, such as the A-BEL activation service, may locate different modules of firmware and/or application that may be packaged together to provide a customized firmware/application configuration for download. The user may select from the menu firmware and software options that tailors (i.e. customizes) the firmware and application configuration of the device to the user's use of the device. For example, the user may be able to set a clock speed for the processor or for a graphics processor (e.g., overclock the processor for increased performance) within the mobile device. As a result of the selection, for example, the mobile device performance may be improved during video playback or gaming, but at the expense of reduced battery life. Alternatively, when the user of an open device (e.g., a device without branded applications or services pre-installed) selects to use a particular network, such as A-BEL or C9, the user may be able to choose firmware of the selected network.

The firmware and application menu may be presented based on a modular design of the software code that is used to implement each selected feature service and proprietary application. Based on the user selections, the firmware and software modules that implement the respective firmware selections and proprietary applications are packaged in a "customized" firmware/software build for delivery, via an over-the-air transmission, to the mobile device. In addition, the software code for a baseline operating system (OS) is selected based on, for example, the manufacturer and model of the mobile. After the user has completed the construction of their custom firmware-on-demand, the server (e.g., activation server) that provides the firmware-on-demand, locates and connects to the mobile device via the A-BEL cellular network or a radio access network, such as Wi-Fi or the like. Using FOTA, the baseline OS and customized proprietary firmware and proprietary software are delivered to the mobile device. Upon receipt of the baseline OS and customized proprietary firmware and proprietary software, the mobile device processor may proceed to install the baseline OS and the customized proprietary firmware and proprietary software. The FOTA may occur while the user connection with the cellular carrier website or portal is active. Upon completion of the installation, the mobile device 104 may be activated in the A-BEL cellular communication network. The activation server may note the successful activation. In which case, the user may be presented with a message from the server requesting confirmation that the FOTA was successful, or may provide a confirmation message to the user that the FOTA was successful. Alternatively, if the FOTA was unsuccessful, the server may provide suggestions for remedying the FOTA failure.

In another alternative, and as mentioned above, the insertion of the A-BEL-branded UICC in mobile device 104 may cause the mobile device processor to enable proprietary software and proprietary feature services associated with Carrier A-BEL pre-stored on the mobile device 104 by the original equipment manufacturer. The enablement of the Carrier A-BEL pre-stored proprietary software and proprietary feature services may be performed according to the process outlined above with respect to FIG. 1.

Furthermore, upon activation of the mobile device 104 into the A-BEL cellular carrier network, a A-BEL proprietary user interface 221 logo may be presented on a display device 124, for example, when the mobile device is turned ON, of the mobile device as well as other locations of the device as will be described in more detail in the discussion of FIG. 7.

In another example of the transition from C9 cellular carrier to the A-BEL cellular carrier, the user may wish to keep one or more proprietary feature services and/or proprietary applications.

For example, the user may want to keep the "myC9" application when the user transitions to the A-BEL cellular network because the C9 corporation may also provide the user with Internet service at the user's residence. The user/subscriber may, for example, access Carrier C9 web portal via an Internet-enabled computer, and select the proprietary applications (which may only be available on a particular cellular carrier network) that the subscriber wants to keep. In other words, the user builds a customized proprietary feature service and application build for the mobile device through the Carrier C9 web portal. The customized build, in some examples, may be available to the mobile device via a download, such as OTA. For example, when the user migrates to the A-BEL cellular network, and the mobile device detects the insertion of the A-BEL-branded UICC, the mobile device processor may, based on settings of the mobile device, establish contact with the Carrier C9 portal and request the installation of the customized build of the mobile device.

The user may also wish to unlock (e.g., root, jail-break, etc.) their mobile device so that the mobile device is not limited by any carrier requirements. In addition, the mobile device is not supported by any carrier, so if there is a problem with the device, the user cannot rely on the carrier for assistance.

The View C of FIG. 3 illustrates an example of a device that is unlocked when no longer supported by any carrier. When the mobile device determines that a UICC is not installed in the mobile device for a period of time, the mobile device processor may generate a prompt, such as "Your Device is no longer supported by any carrier. Would you like to unlock the device?," inquiring if the user wishes to unlock the device. If the user agrees, any carrier proprietary software is rendered unavailable by the mobile device 104 processor, and only the base feature services 233 are available to the mobile device. However, some of the base features, such as text messaging or voice service, may be useless without access to a communication network. Said differently, the base feature services 233 are native to the mobile device 104, and represent the minimum services that are typically provided by a mobile device (from any manufacturer) through a communication network, whether the communication network is a cellular network or a data network. Base feature services are typically unchanged from one device to another device. For example, in addition to the other mentioned services, emergency calling is available as a base feature service. By unlocking the mobile device, the user is able to take their mobile device from US to overseas and vice versa, and access carrier networks in other countries. Alternatively, the device 106 is an open device, which is a device that was never locked by or for a particular cellular carrier.

Figure 4:
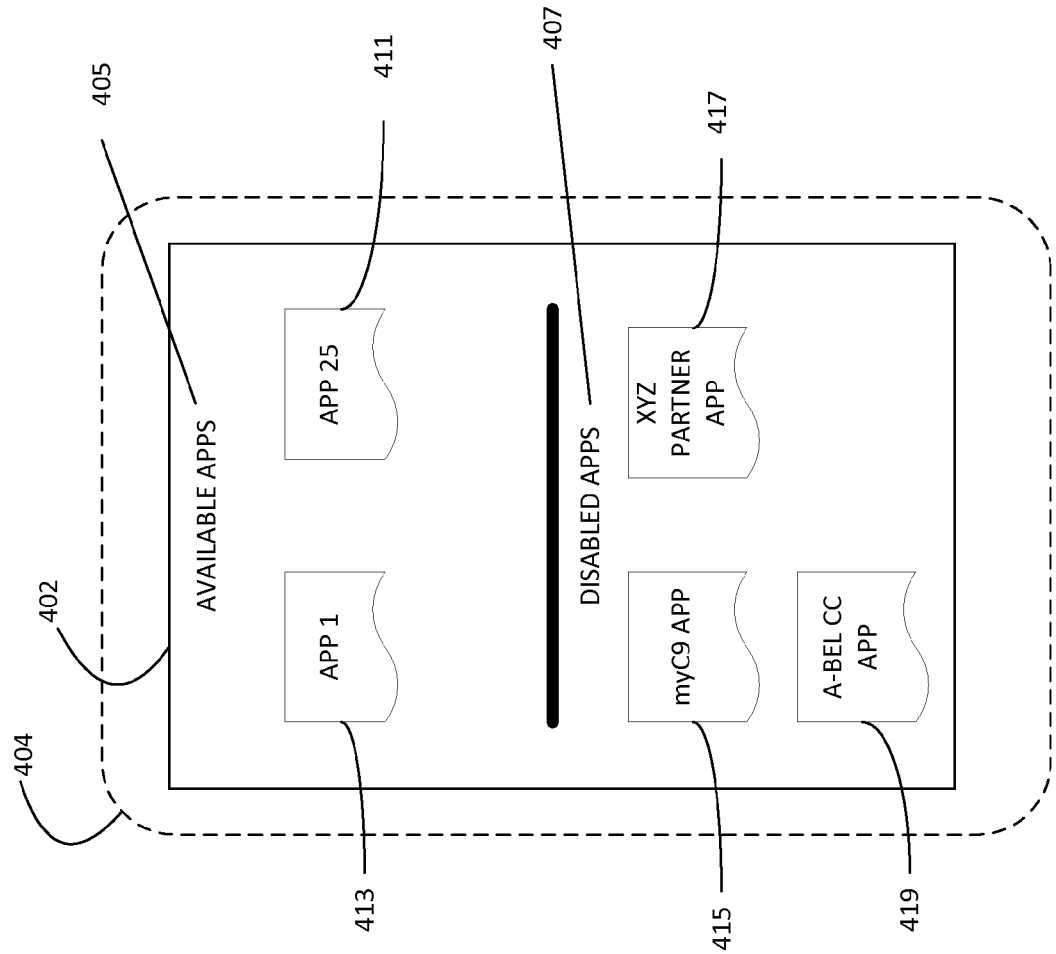
FIG. 4 illustrates an example of a graphical user interface provided in response to the enablement and disablement of pre-provisioned with proprietary feature services and applications of a mobile device.

In some examples, a user may roam into another country and inserts a UICC for each respective country that the user is going to travel. The proprietary software of the previous network is rendered unavailable. In such instances, the user could choose to clean up personal information generated by proprietary feature services or proprietary application of the different cellular carriers. In these instances, a user content database (shown in another example) controlled by a user content server (also shown in another example) associated with the user subscription to the respective cellular carrier networks. While switching from one cellular carrier network to another cellular carrier network, some branded applications may have personal data established (e.g., saved credentials and user preferences from other branded applications or the like). In these cases, a user interface and memory partition are provided to maintain this data in case the user wants to switch back to his home carrier. FIG. 4 illustrates an example of a user interface that illustrates enabled and disabled applications.

In FIG. 4, the mobile device 404 may provide a display device 402 on which is presented a graphical user interface. The graphical user interface may have two areas: an Available application (Apps) area 405 and a Disabled Apps area 407. In the present example, the available applications are APP 1 413 and APP 25 411, while the disabled applications, which are all proprietary apps, are myC9 CC APP 415, XYZ Partner APP 417 and A-BEL CC APP 419.

This example of a graphical user interface provides the user with an indication of which applications (and, in some cases, features) are unavailable to the user. Other examples of a graphical user interface may also be provided to the user. For example, the areas 405/407 may be the left and the right sides, respectively, of the display device 402.

The mobile devices referred to in the discussion of FIGS. 2-4 above were described with reference to one or more cellular communications networks. It may be appropriate to discuss an example of a network configuration suitable for implementing a pre-provisioned device customization service that enables pre-provisioned proprietary feature services and application as described herein.

Figure 5:
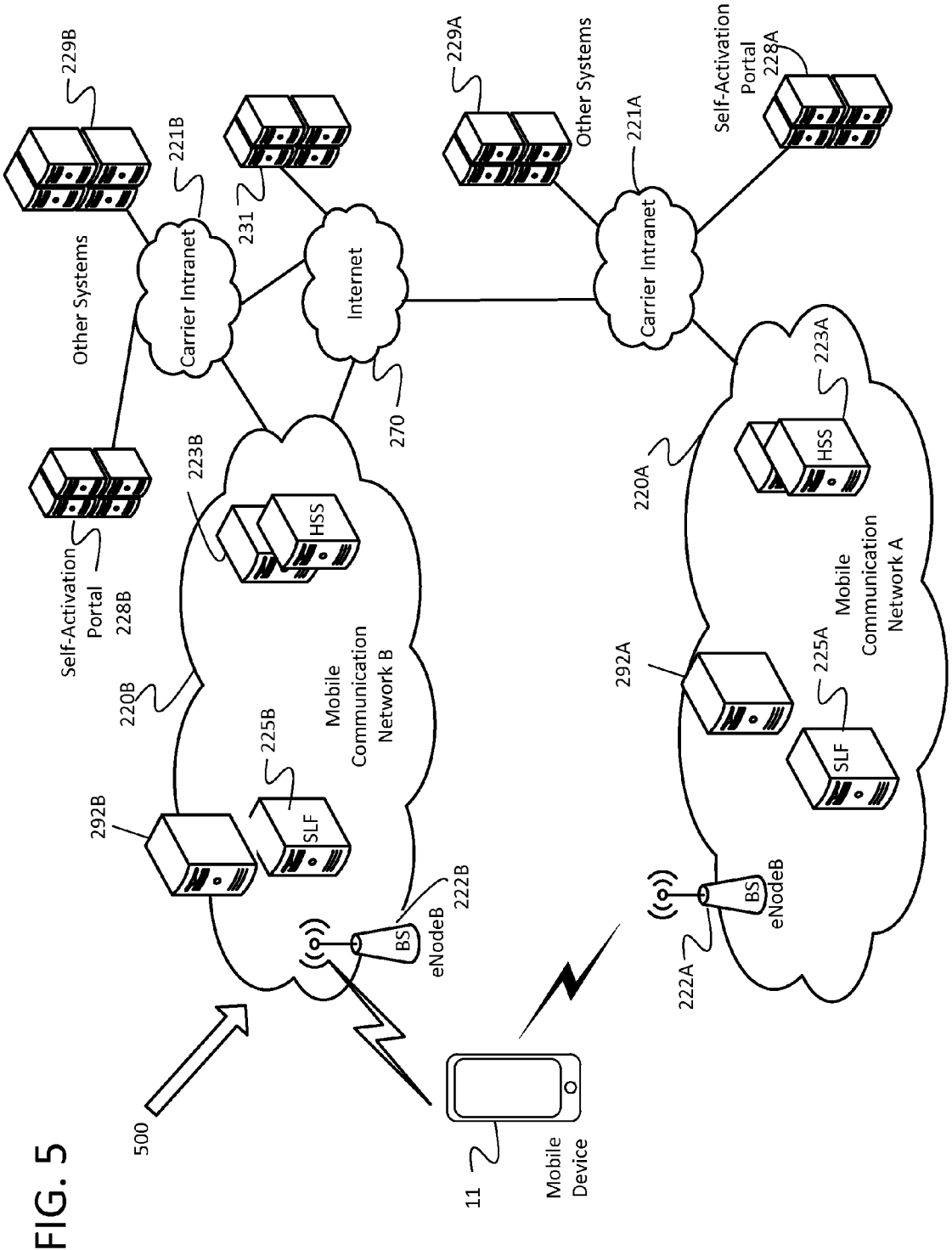
FIG. 5 is a high-level functional block diagram of an example of a system of networks/devices that provide various communications for mobile devices and support an example of the pre-provisioned device customization service for enabling pre-provisioned proprietary feature services and application.

FIG. 5 is a functional block diagram of an example of a system that supports various mobile communication services and which may implement a self-activation portal for activation of a mobile device, such as mobile device 11. Although more than the two mobile communication (e.g., cellular carrier) networks may be accommodated by the disclosed examples, only two cellular carrier networks (Mobile Communication Network A and Mobile Communication Network B) are shown in FIG. 5 for ease of explanation.

The illustrated system 500 services any number of mobile devices, including the illustrated mobile devices 11. Each of the mobile devices 11 in our example corresponds to a smartphone or tablet itself having network communication capability that utilizes a UICC (also referred to as a subscriber identity module (SIM) card, which in this discussion, may be used in the pre-provisioned device customization process.

For ease of discussion, only one of the mobile communication networks will be discussed in detail below. Although exact details of various carriers' networks may differ in some aspects from one another, for example, with respect to the particular over-the-air bands or technologies, the general functionality of network components described below are provided in most networks.

The illustrated system example includes a mobile communication network 220A, in this example, operates in accordance with 4G LTE standards. Mobile network 220A may provide mobile telephone communications as well as Internet data communication services. Data communications via mobile network 220A provided for users of devices like mobile device 11 may support a variety of services such as communications of text and multimedia messages, e-mail, web browsing, streaming or downloading content, etc. with network connected equipment represented generically by the server 231 in the drawing. Voice communication also may involve transport via the Internet 270 using voice over Internet Protocol (VoIP) technologies. Mobile device 11 may connect to mobile network 220A through a cellular base station 222A, two of which appear in the drawing by way of example.

For convenience only, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB, and the wireless mobile devices are types of user equipment (UE) devices. Packet routing and control functions may be implemented in packet routers and/or associated server platforms in the radio access network (RAN) or in many cases in elements of an IP Multimedia Service (IMS) core network (not shown separately) coupled to some number of 4G RANs, although such routing and control element(s) are generically included in the broad class of devices that may be used to implement the network functionality discussed here.

The carrier that operates the network 220A will also utilize a variety of other systems for related purposes, such as maintenance, accounting and provisioning. In the example, the carrier has another data network, e.g. Intranet 221A, that provides data communications for other data systems used by the carrier, and that network 221 has connectivity into the network 220A that provides the actual communications services to the carrier's customers. For purposes of the present discussion, equipment communicating via the network 221A includes a self-activation portal server 228A as well as a number of other systems that will be involved in provisioning and the like in the self-activation process. The other systems for provisioning, etc. are shown collectively at 229A in FIG. 2.

The self-activation portal 228A, in the examples, is a server functionality implemented on one or more network connected computers. A self-activation application (not shown in this example) is, for example, an application installed on mobile device 11 that facilitates the capture of unique identifying information that is not currently activated for services by the mobile wireless communication network. The self-activation application may implement client functionality on the mobile device 11 for interaction with the server functionality of the self-activation portal 228A in order to complete activation of the currently unsubscribed mobile device.

The self-activation portal 228A, for example, supports the self-activation system by receiving messages from the mobile device 11 and by sending messages to the mobile device 11 (e.g., via hyper-text transfer protocol (HTTP)). The self-activation portal 228A, in the examples, also contains client functionality to interact with other elements within the network 220A and/or the network 221A for completing the self-activation process.

For authentication and authorization purposes, the network 220A includes a number of home subscriber servers. A home subscriber server (HSS) 223A is an example of a computer or the like that maintains account or customer related service profile records associated with mobile devices that are allowed access to communication service through the mobile network. Of note for purposes of the present discussion, the HSS 223A operates as a control point for providing instructions to other network elements, based on the profile records, so that the network delivers communications services to the mobile devices in accordance with the respective profile records.

In the network 220A in our example, the HSS 223A is a platform that stores a database of profile records for mobile devices, such as mobile device 11, authorized for service through the network 220A. The HSS 223A provides data upon request to enable session control elements (not separately shown) to control the flow of sessions through the 4G LTE network 220A for the mobile devices, e.g. to authenticate a particular mobile device and to indicate that the mobile device is or is not authorized to utilize a particular network service. The HSS profile record for a mobile device may include relevant identification information, subscription information and possibly information about the location of the device and/or IP (Internet Protocol) address assignment information. A large network deployment, for serving a substantial number of mobile devices, includes a number of actual call processing HSS servers, two of which are shown at 223A in the drawing. Each activated mobile device, such as mobile device 11, will have a record stored in one of the databases of the HSS servers 223A. The network 220A will not provide service to a mobile device unless the mobile device has a record in an HSS 223A and may even terminate an ongoing session when a record for the mobile device is deleted from an HSS 223A. The HSS 223A may also be configured as a self-activation HSS that only manages and maintains information regarding mobile devices that are attempting to self-activate.

The mobile device 11 includes a Universal Integrated Circuit Card (UICC) or module. The UICC in the un-activated mobile device 11 is pre-provisioned, but only for restricted service sufficient to enable self-activation, for example.

For a mobile device 11 that is not activated at the present time, there will not be a record to define service for that the UICC for that mobile device 280 on an HSS 223 stored in a diameter routing agent (DRA) subscriber location function (SLF) 225A. However, the DRA SLF 225A is configured with default routing information so as to route authentication and authorization related communications for such an un-activated mobile device 11 to the HSS 223A, which is functioning as a self-activation HSS. Assuming that the device 11 has a pre-provisioned UICC, there will be a record for that UICC in the HSS 223A. The record for the mobile device 11 in that HSS 223A, however, supports only restricted network access for the mobile device. In operation, when the user turns on the presently not activated mobile device 11 within the network footprint and attempts a data communication, a session control element will signal the DRA SLF 225A to identify an HSS, and the DRA SLF 225 will identify the HSS 223A. The session control element will then query the HSS 223A regarding authentication/authorization; and based on the device record in that HSS 223A, the HSS 223A will instruct that session control element to route the user's data sessions to the self-activation portal 226. Note that the HSS 223A is continuing to provide functionality of the self-activation HSS. The pre-provisioning of UICC without active subscriber accounts will assure that the device 11 will be able to authenticate and acquire an IP address and in turn be able to reach the self-activation portal 228A.

Other entities in the mobile communication network A (220A) assist with the provisioning and self-activation of the mobile device 11 into the network. For example, an enterprise Telephone Number Inventory (eTNI) 292A is database that stores information associated with telephone numbers of mobile devices, UICC information for the cards associated with the mobile devices and pertinent current state information. Thus, for example, the eTNI 292 includes a table that maps an IMSI to UICC identifier. The eTNI database 292 also includes a table that is used to assign a telephone number to a SIM card ICCID. For pre-provisioned UICCs, the eTNI database will also list ranges of ICCIDs and IMSIs that manufacturers will assign to UICCs for the carrier's customers as "pre-provisioned." The eTNI database will also indicate a state of each UICC. At manufacture, the original equipment manufacturer (OEM) will assign ICCIDs and IMSIs from the pre-provisioned ranges to particular UICCs and load such data as needed into the UICCs. In addition, as explained above, the OEM pre-provisions the mobile device with proprietary feature services and applications of the particular carrier. The OEM will also send the IMSI and encryption keys associated with the pre-provisioned UICC to the carrier equipment, e.g. to provisioning system, which is part of the other systems 229A.

An example of a specific provisioning system entity within the other systems 229A is a Mobile Telephone Administration System (MTAS). If implemented by MTAS or a similar system, the provisioning system in 229A may be an intelligent highly configurable suite of applications responsible for provisioning all types of subscriber devices and their services on the carrier's particular network equipment. The MTAS is responsible for communicating with other portions of system 500 to provide data to enable activation of the mobile device 11. The portal 228A triggers a procedure to provision a mobile device 11 on the network, for example, by providing appropriate information and/or instructions to the provisioning system of other systems 229A. The provisioning system receives requests to activate mobile device 11, for example, from the portal 228A; and in response, the provisioning system supplies data to other system components (also shown collectively as 229A) so as to enable service for the mobile device 11 on the network. The provisioning system may also provide notification(s) of status of various provisioning tasks back to the portal 228A, for example, so that the portal 228A can notify the user of progress and/or that activation of mobile device 11 is complete.

As outlined earlier, the DRA-SLF 225A facilitates the function of routing signaling traffic for authentication and authorization traffic to appropriate HSS platforms 223A, as mobile devices seek and use packet-based communication services through the mobile communication network 220A. In normal operations for activated mobile devices, the HSS platforms 223A in turn respond to queries so as to enable control of sessions for activated mobile devices through the network 220A. The DRA-SLF 225A maintains a list of mobile devices that have been activated with data mapping the mobile device identifiers to the appropriate ones of the HSS platforms 223A. To be fully activated on the network 220A, a mobile device must have a record in the mapping table of the DRA-SLF 225A as well as a record in an HSS 223A that indicates policies and service permissions applicable to the particular mobile device. If a telephone number of a mobile device is not stored in DRA-SLF, then this indicates that the mobile device with that telephone number has not been activated. If a request for establishment of an IP session from mobile device 11 is received by DRA-SLF 225A, and the UUICC credentials for the device/UICC are not provisioned in the DRA-SLF 225A, then the DRA-SLF 225A knows to apply a preconfigured default. Rather than signaling a failure, however, the default configuration causes the DRA-SLF 225A to instruct the applicable network element(s) to signal the self-activation HSS 223A to determine authentication and authorization. Assuming that the UICC in the mobile device 11 is pre-provisioned at the self-activation HSS 223A, then the HSS 223A causes the network 220A to route the data session of the mobile device 11 to the self-activation portal 228A. Of note, as part of a provisioning for a newly activated mobile device 280, an entry is added to the DRA-SLF 225A for that device identifying the particular one of the HSSs 223A that holds the profile record for that device.

The other systems 229A of FIG. 5 also provide a UICC/Over-the-Air (UICC OTA) 297 server. In an example, the UICC/OTA 297 may be a server connected to the network 220A or 221A, to enable the server to communicate with the mobile device 11. The UICC OTA server is used to supply provisioning information to the mobile device itself. The mobile device is configured to try to communicate with the UICC OTA, for example, whenever the device is booted-up. For an activated device, this may allow the device to replace corrupted data and/or to obtain updates (e.g. a new preferred roaming list) or patches. As part of a self-activation procedure, the provisioning system will provision the UICC OTA server with data that is to be loaded into the mobile device 280. For example, when using the firmware on demand option described above, this function may be performed according to the described processes. For example, as described above and/or at the end of the activation procedure, the mobile device 11 will be re-booted (and follow the process outlined above with respect to FIG. 1), which will in part cause the device 1 to communicate with the UICC OTA server; and the UICC OTA server will send the appropriate data to the device for installation in the UICC.

In the examples when a user is switching from one cellular carrier to another cellular carrier, the provisioning system may disconnect the subscriber by sending instructions to the mobile device to delete previously provisioned data for the device from network components, such as the DRA-SLF 225A, eTNI 292A and HSS 223A. However, the provisioning system provisions the subscriber with the self-activation function of the HSS 223A, for example, as an inactive subscriber. In this way, the device may be re-activated in future.

When transitioning to another cellular carrier network such as mobile communication network B 220B similar processes and functions may be performed. For example, the cellular carrier system may include the mobile communication network B 220B, a carrier intranet 221B, self-activation portal 228B, and other systems 229B, such as a provisioning system or MTAS. The mobile communication network B 220B may include the eNodeB 222B, a SLF 225B, an eTNI 292B, and an HSS 223B (which provides the self-activation HSS functions). The mobile communication network B 220B may also have connections to the Internet 270 and server 231.

Of course, other network implementations may be utilized to provide structural and computing elements required for the provisioning and activation examples described herein.

The pre-provisioned device customization service for enabling pre-provisioned proprietary feature services and application under consideration here may be implemented with touch screen type mobile devices. Hence, our simple example shows the mobile device 11 as a touch screen type mobile device. Implementation of the pre-provisioned device customization service for enabling pre-provisioned proprietary feature services and application will involve at least some execution of programming in the mobile devices as well as implementation of user input/output functions and data communications through the network 220A or 220B, from the mobile devices. As such, it may be useful to consider the functional elements/aspects of an example of a mobile device, at a high-level.

Figure 6:
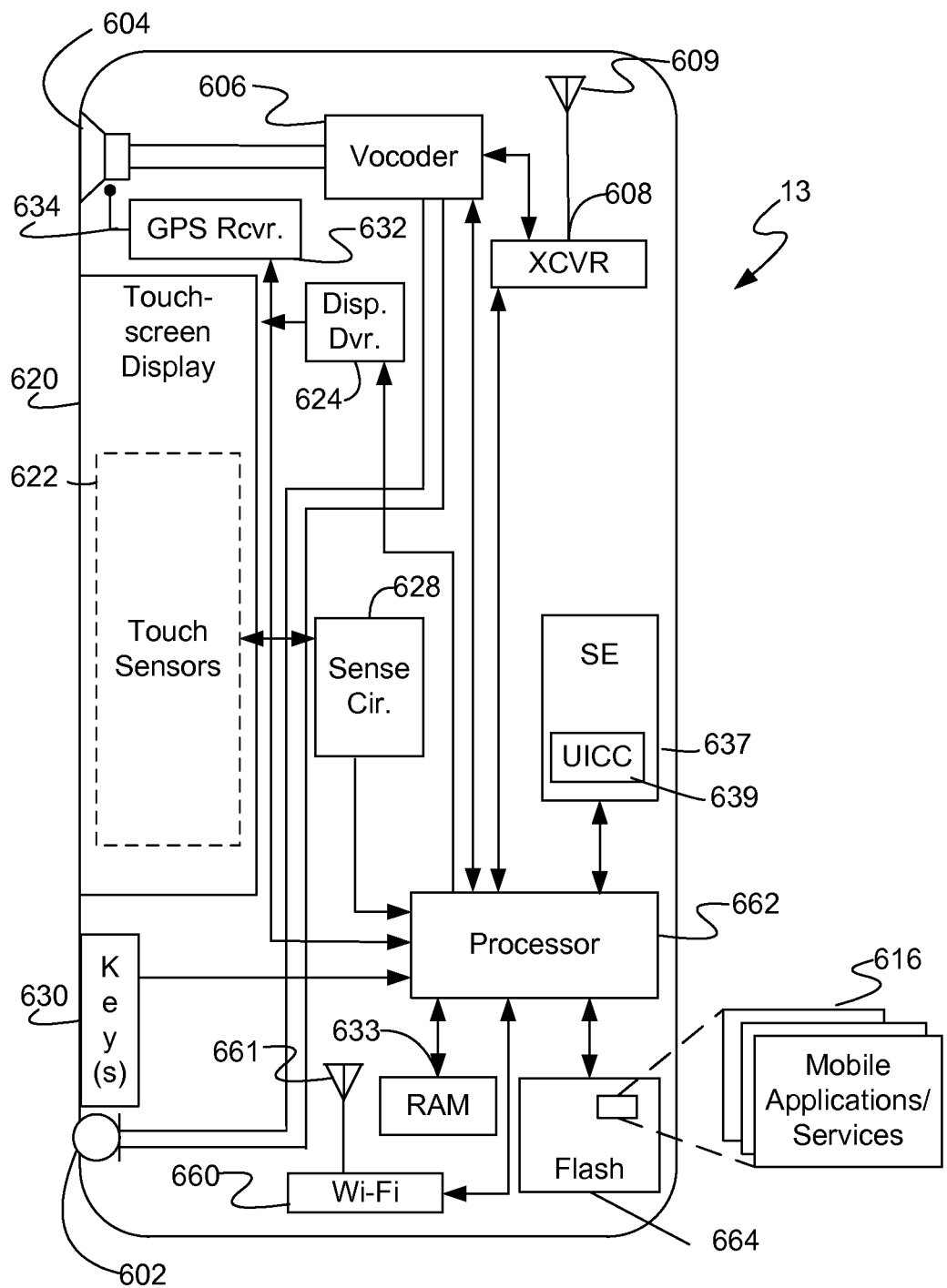
FIG. 6 is a high-level functional block diagram of an example of a touch screen type mobile device as may utilize the pre-provisioned device customization service for enabling pre-provisioned proprietary feature services and application through a network/system like that shown in FIG. 1.

FIG. 6 provides a block diagram illustration of an example of touch-screen type mobile device 13. Although the mobile device 13 may be a tablet or may be incorporated into another device, such as a personal digital assistant (PDA) or the like, for discussion purposes, the illustration shows the mobile device 13 is in the form of a handheld smartphone. The mobile device 13 functions as a normal digital wireless telephone device. For that function, the device 13 includes a microphone 602 for audio signal input and a speaker 604 for audio signal output. The microphone 602 and speaker 604 connect to voice coding and decoding circuitry (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (e.g., Internet Protocol) communications.

For digital wireless communications, the mobile device 13 also includes at least one digital transceiver (XCVR) 608 for digital wireless communications via a wide area wireless mobile communication network, although the mobile device 13 may include additional digital or analog transceivers (not shown). The transceiver 608 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 608 provides two-way wireless communication of information including digitized audio signals, still image and/or video signals, web page information for display as well as web related inputs, and various types of mobile message communications to/from the mobile device 13.

The transceiver 608 provides two-way wireless communication of information, such as vocoded speech samples and/or digital information for data communications (including for authentication), in accordance with the technology of the networks of FIG. 5. The transceiver 608 also sends and receives a variety of signaling messages in support of the various voice and data services provided via the mobile device 13 and the communication network. Each transceiver 608 connects through RF send and receive amplifiers (not separately shown) to an antenna 609. A mobile device 13 may include a variety of different types of user interface elements. The mobile device 13 includes a display 620 for displaying messages, menus or the like, call related information dialed by the user, calling party numbers, etc., including the described for the mobile device video calling upgrade service. For output purposes, the touch screen 620 includes a display screen, such as a liquid crystal display (LCD) or the like. For example, the touch screen display 620 is used to present information (e.g., text, video, graphics or other visible digital media content) to the user of mobile device 13. Processor 662 controls visible display output on the LCD or other display element of the touch screen display 620 via a display driver 624, to present the various visible outputs to the device user. In general, touch screen display 620 and touch sensors 622 (and one or more keys 630, if included) are used to provide the textual and graphical user interface for the mobile device 13. In an example, touch screen display 620 provides viewable content to the user at mobile device 13. Touch screen display 620 also enables the user to interact directly with the viewable content provided in the content display area, typically by touching the surface of the screen with a finger or an implement such as a stylus. Other interface elements may include a keypad including one or more keys 630. For example, the keypad may be implemented in hardware as a T9 or QWERTY keyboard of mobile device 13 and keys 630 may correspond to the physical keys of such a keyboard. Alternatively, keys 630 (and keyboard) of mobile device 13 may be implemented as "soft keys" of a virtual keyboard graphically represented in an appropriate arrangement via touch screen display 620. The soft keys presented on the touch screen display 620 may allow the user of mobile device 13 to invoke the same user interface functions as with the physical hardware keys. Keys 630 or a virtual keyboard presented via the touch-screen display 620 may enable dialing digits for voice and/or data calls as well as generating selection inputs, for example, as may be keyed-in by the user based on a displayed menu or as a cursor control and selection of a highlighted item on a displayed screen. The touch-screen display 620 and keys 630 are the physical elements providing a textual or graphical user interface. Various combinations of the keys 630, touch-screen display 620, microphone 602 and speaker 604 may be used as the physical input output elements of the graphical user interface (GUI), for multimedia (e.g., audio and/or video) communications including communications/interactions related to voice and/or video calling. Of course other user interface elements may be used, such as a trackball, as in some types of PDAs or smart phones.

As shown in FIG. 6, the mobile device 13 also includes a sense circuit 628 coupled to touch sensors 622 for detecting the occurrence and relative location/position of each touch with respect to a content display area of touch screen display 620. In addition, the sense circuit 628 is configured to provide processor 662 with touch-position information based on user input received via touch sensors 622 (e.g. a user interface element). In some implementations, processor 662 is configured to correlate the touch position information to specific content being displayed within the content display area on touch screen display 620. The touch-position information captured by sense circuit 628 and provided to processor 662 may include, but is not limited to, coordinates identifying the location of each detected touch with respect to the display area of touch screen display 620 and a timestamp corresponding to each detected touch position.

In addition to normal telephone and data communication related input/output, the user interface elements also may be used for display of menus and other information to the user and user input of selections, including any needed during user selection of a menu option. For example, if used as a selection device, the user interface elements allow a user to select the different cellular carrier proprietary feature services and applications inputs.

As shown in FIGS. 3 and 4, the touch screen display 620 and other input devices is used to present various prompts and status information regarding the pre-provisioned device customization examples discussed above as well as to receive inputs regarding user selections and obtaining user information. Using the touch screen display 620, a user selects the various inputs, e.g., "YES" or "NO" buttons for confirming the joining of a carrier network, or selects an icon for applications enabled via the customization examples. In addition, during some of the processes, such as an activation process, the user may be required to input information regarding subscriber account information, user identification, mobile device numbers and the like.

A microprocessor 662 serves as a programmable controller for the mobile device 13, in that it controls all operations of the mobile device 13 in accord with programming that it executes, for all normal operations, and for operations involved in the mobile application voice and/or video calling service under consideration here. A microprocessor, or generally, a processor, is a hardware circuit having elements structured and arranged to perform one or more processing functions, typically various data processing functions. Although discrete logic components could be used, the examples utilize components forming a programmable central processing unit (CPU). A microprocessor for example includes one or more integrated circuit (IC) chips incorporating the electronic elements to perform the functions of the CPU. The microprocessor 662, for example, may be based on any known or available microprocessor architecture, such as a Reduced Instruction Set Computing (RISC) using an ARM architecture, as commonly used today in mobile devices and other portable electronic devices. Of course, other microprocessor circuitry may be used to form the CPU or processor hardware in server computers or other user terminal computer equipment.

The microprocessor 662 serves as the programmable host for mobile device 13 by configuring the mobile device 13 to perform various operations, for example, in accordance with instructions or programming executable by microprocessor 662. For example, such operations may include various general operations of the mobile device 13 as well as operations related to confirming or adjusting operational settings of the mobile device 13, contacting network devices, storing user preference information, controlling encoding/decoding of voice and video data, and the like. Although a processor may be configured by use of hardwired logic, typical processors in mobile devices are general processing circuits configured by execution of programming. The microprocessor 662 connects to other elements of the mobile device 13 via appropriate circuitry, such as bus or terminal connections. In a present example, the mobile device 13 includes flash type program memory 664, for storage of various "software" or "firmware" program routines such as device operating system (OS), voice encoding/decoding algorithms, video encoding/decoding algorithms, programs related to graphical user interface elements and functions. The memory 664 also stores mobile configuration settings, such as the MDN, the IMEID and/or mobile identification number (MIN), etc. The mobile device 13 may also include a non-volatile random access memory (RAM) 633 for a working data processing memory. Of course, other storage devices or configurations may be added to or substituted for those in the example. The memories 664, 633 also store various data, such as telephone numbers and server addresses, downloaded data such as multimedia content, and various data input by the user. Programming stored in the flash type program memory 664, sometimes referred to as "firmware," is loaded into and executed by the microprocessor 662. The logic implemented by the processor 662 of the mobile device 13 configures the processor 662 to control various functions as implemented by the mobile device 13. The logic for a processor 662 may be implemented in a variety of ways, but in our example, the processor logic is implemented by programming for execution by the processor 662. Regular operations of the device are controlled by operation of the processor 662.

There is a variety of ways that a mobile device 13 may be configured to obtain information with respect to current location of the device. In our example, the mobile device 13 includes a global positioning satellite (GPS) receiver 632 and associated antenna 634.

As outlined above, the mobile device 13 includes a processor, and programming, such as mobile application(s)/service(s) 616, stored in the flash memory 664, which configures the processor so that the mobile device is capable of performing various desired functions, including in this case the functions involved in the technique for providing pre-provisioned device customization services. In an example, the mobile applications 616 are the proprietary feature services and proprietary applications discussed above, in which selected ones of the mobile applications 616 are enabled based on the cellular carrier that provided the UICC 639. According to the above examples, one or more of the mobile applications/services 616 may be enabled, or disabled, and remain stored in the memory 664. Alternatively, the respective disabled mobile application/service may be deleted from the memory 664. As discussed above in one or more of the example, the mobile application files 616 may include, in addition to the non-proprietary applications and downloads discussed above with respect to FIGS. 1 and 2, user data and information related to the use of the non-proprietary applications and downloads may be stored in flash memory 664. This additional user data and information may be made available by the processor 662 when the user switches from one cellular carrier to another cellular carrier. For example, the user data and information may be stored in a location of the flash memory for later retrieval by the processor 662 when the transition to a subsequent cellular carrier is completed. Proprietary user data (e.g., non-personal data) may also be stored in the memory 664, if permitted by the respective cellular carriers. The mobile applications 616, if proprietary to a cellular carrier, may include encryption or other methods to prevent the respective proprietary mobile applications or related proprietary user data from being obtained or used by a user that is not a subscriber of the cellular carrier that provides the respective proprietary mobile applications.

As an alternative to storing the proprietary applications, firmware or proprietary feature services in the memory 664, the proprietary feature services and proprietary applications and any generated user data may be stored in a secure memory location. The secure memory location, for example, is a memory location that only certain applications, such as a self-activation application launched in response to a the determination of whether UICC is inserted in the mobile device 13, is permitted to access. For example, the secure memory location may be a portion of memory in a secure element 637 of the mobile device 130, for example, it may be a memory location incorporated in the UICC 639 of the mobile device 13. Alternatively, encrypted files containing the proprietary feature services and applications (which may also be encrypted) may be stored in the memory 664, and the encryption keys and memory location address of the encrypted files may be stored in the SE 637. Alternatively, the encryption keys and memory location addresses may be stored on the UICC 639.

The mobile device 13 includes mobile application 130, mobile device secure memory, which may be part of mobile device memory 664, and secure element 637. The mobile application 616 executes on a processor (described in more detail with respect to FIGS. 6 and 7) of the mobile device 13. The mobile device 13 also includes secure data storage. Although a part of memory 114 may be designated and secured for this purpose, the example utilizes a secure element (SE) 637 that, in one example, is separate chip that includes a secure processor, a tamperproof storage and a memory, and is configured to communicate with applications executing on the processor 112. The secure memory of the SE 139 may contain applications that run inside the secure processor and may provide secure storage for data used by various applications such as mobile application 130, or secure authentication keys (e.g., for activation with a particular network and facilitating enablement/installation/download of the respective proprietary feature services or proprietary applications) and secure identifiers, such as the ICCID, of the mobile device 13.

For example, the SE 139 secure memory may include various user account information, such as account number, user identification, a personal identification number (PIN), or the like for user verification and possibly account balance and/or transaction record information. In addition, the SE 139 secure memory may store the different cellular carriers' proprietary feature services and proprietary applications. In various examples, the secure element may be part a UICC 639 or a separate secure element like a secure digital (SD) memory card used for storing and accessing applications and data, such as the proprietary feature services and proprietary applications, in a secure manner. The UICC 639 may be inserted into an interface configured to establish electrical contact with a universal integrated circuit card for communicating data to the processor 662. The UICC 639 interface may be in a location within the mobile device 13, and may be or may incorporate a SIM card. In one example, the SE 637 is separate chip that includes a secure processor, a tamperproof storage and a memory, and is configured to communicate with feature services (proprietary or base) or non-proprietary and proprietary applications executing on the processor 662.

The SE 637 may include various account information, such as account number, user identification, a personal identification number (PIN), or the like for user verification and possibly account balance and/or transaction record information. The SE 637 may be used to authenticate a device for access to an activation server, application server or the like in a network. In various examples, the secure element may be part a UICC 639 or a separate secure element like a secure digital (SD) memory card used for storing and accessing applications and data, such as mobile device application-level biometric authentication keys, in a secure manner.

Figure 7:
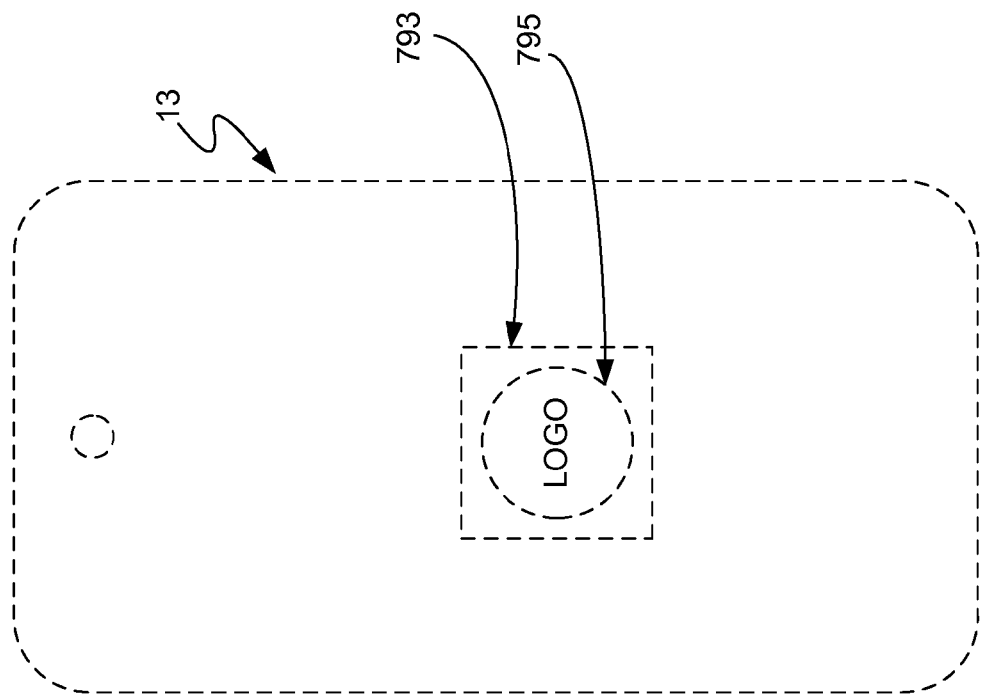
FIG. 7 is an example of a pre-provisioned mobile device exhibiting a brand logo of a cellular carrier.

FIG. 7 shows an example of a pre-provisioned mobile device exhibiting a brand logo of a cellular carrier. The view is the back side of the mobile device 13, which is typically a cover. However, in this example, the back side of the mobile device 13 is configured with a display device 793, such as an electronic ink (i.e., e-ink) display. The display 793 may be color or monochromatic and may be very low power or even configured to obtain power from the environment (e.g., solar, motion based or the like). The display 793 may be coupled to, and may respond to commands from the processor 662. For example, in response to a determination that the UICC inserted into the mobile device 13 is a branded UICC (e.g., a C9 cellular carrier UICC), the processor 662 may cause the display 793 to present a logo 795 that is the C9 cellular carrier branded logo. Similarly, if the branded UICC is an A-BEL cellular carrier UICC, the logo 795 is the A-BEL branded logo that is presented on the display 793. Although the display 793 is shown substantially in the center of mobile device 13 is may be located at any location on the backside of the mobile device 13. In addition, the shape of display 793 is shown substantially square but may be any shape suitable for implementation on the mobile device 13. As for the shape of logo 795, it is shown as circular, but may be any shape or design as specified by the respective brand of UICC and/or that is suitable for implementation on the display 793. In the case of an unbranded UICC, the processor 662 may provide options to the user for selection of an image or other graphic, or message (e.g., "Bob's Phone") in the display 793.

The structure and operation of the mobile device 13, as outlined above, were described to by way of example, only.

As shown by the above discussion, functions relating to the operation of the mobile device experience for the implementation of different functions, such as pre-provisioned device customization and the firmware-on-demand service may be performed, via a graphical user interface of a mobile device, may be implemented on computers connected for data communication via the components of a packet data network, operating as a user device and/or as a server as shown in FIG. 1. Although special purpose devices may be used, such devices also may be implemented using one or more hardware platforms intended to represent a general class of data processing device commonly used to run "server" programming so as to implement the pre-provisioned device customization functions and firmware-on-demand discussed above, albeit with an appropriate network connection for data communication.

The software functionalities involve programming, including executable code as well as associated stored data, e.g. files used for the pre-provisioned device customization. The software code is executable by the general-purpose computer that functions as the activation server and/or that functions as a mobile device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for pre-provisioned device customization, in essentially the manner performed in the implementations discussed and illustrated herein.

FIGS. 8 and 9 provide functional block diagram illustrations of general purpose computer hardware platforms. FIG. 8 illustrates a network or host computer platform, as may typically be used to implement a server, such as the self-activation portal server 228A, 228B in FIG. 5. A computer with user interface elements as depicted in FIG. 9 depicts may be used to implement a personal computer or other type of work device or terminal device, although the computer of FIG. 9 may also act as a server if appropriately programmed. It is believed that the general structure and general operation of such equipment as shown in FIGS. 8 and 9 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface, a central processing unit (CPU), main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of pre-provisioned device customization service for enabling pre-provisioned proprietary feature services and application outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile device manufacturer or cellular carriers into the computer platform of the respective cellular carriers that will be the activation or self-activation server or a third party server that provides the pre-provisioned device customization service for enabling pre-provisioned proprietary feature services and application under agreement with cellular carriers. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the examples of the pre-provisioned device customization, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
an interface to establish an electrical contact with a universal integrated circuit card;
a memory to store:
proprietary feature services and proprietary applications associated with two or more cellular carriers;
a processor, coupled to the memory, to:
determine that a first universal integrated circuit card inserted into the interface is associated with one of the two or more cellular carriers;
enable, based on the first universal integrated circuit card being associated with the one of the two or more cellular carriers, one or more proprietary feature services, of the proprietary feature services, that are associated with the one of the two or more cellular carriers, and one or more proprietary applications, of the proprietary applications, that are associated with the one of the two or more cellular carriers;
detect removal of the first universal integrated circuit card from the interface;
determine that a second universal integrated circuit card, inserted into the interface subsequent to the removal of the first universal integrated circuit card from the interface, is not associated with the two or more cellular carriers;
disable, based on determining that the second universal integrated circuit card is not associated with the two or more cellular carriers, the one or more proprietary feature services and the one or more proprietary applications;
convert, based on determining that the second universal integrated circuit card is not associated with the two or more cellular carriers, data generated by the one or more proprietary feature services or the one or more proprietary applications into a non-proprietary format; and
enable, based on the second universal integrated circuit card not being associated with the two or more cellular carriers, one or more base feature services, and one or more non-proprietary applications,
the one or more base feature services and the one or more non-proprietary applications being capable of utilizing the data in the non-proprietary format.

2. The mobile device of claim 1, wherein, based on determining that the second universal integrated circuit card is not associated with the two or more cellular carriers, the one or more proprietary feature services and the one or more proprietary applications, associated with the one of the two or more cellular carriers, remain stored in the memory of the mobile device.

3. The mobile device of claim 1, wherein, based on determining that the second universal integrated circuit card is not associated with the two or more cellular carriers, the one or more proprietary feature services and the one or more proprietary applications, associated with the one of the two or more cellular carriers, are deleted from the memory of the mobile device.

4. The mobile device of claim 1, wherein the processor is further to:
store the one or more non-proprietary applications in a memory location of the memory unaffected by enabling and disabling of the one or more proprietary feature services and the one or more proprietary applications associated with the two or more cellular carriers.

5. The mobile device of claim 1, wherein the processor is further to:
receive an indication of a particular proprietary application, associated with the one of the two or more cellular carriers, that a user has selected for retention on the mobile device when switching to the other one of the two or more cellular carriers; and
retain the particular proprietary application, associated with the one of the two or more cellular carriers, as a fully-functioning application on the mobile device after the mobile device switches to receiving service from the other one of the two or more cellular carriers.

6. The mobile device of claim 1, wherein the processor is further to:
access a file stored on the first universal integrated circuit card; and
locate an identifier of the one of the two or more cellular carriers stored in the file.

7. The mobile device of claim 6, wherein the identifier of the one of the two or more cellular carriers is located in a group identifier field of the file.

8. The mobile device of claim 1, wherein the processor is further to:
based on determining that the first universal integrated circuit card is associated with the one of the two or more cellular carriers, provide for presentation a proprietary user interface logo and a user interface message associated with the one of the two or more cellular carriers.

9. The mobile device of claim 1, wherein the processor is further to:
transmit an activation request including a content address that identifies the mobile device for authentication,
the content address including a uniform resource locator; and
upon authentication of the mobile device, download firmware that implements the one or more proprietary feature services associated with the one of the two or more cellular carriers.

10. The mobile device of claim 9, where the processor is further to:
receive a first message requesting confirmation that the firmware is downloaded by the mobile device; and
transmit a second message confirming that the firmware is downloaded.

11. The mobile device of claim 1, where the processor is further to:
based on determining that the first universal integrated circuit card is associated with the one of the two or more cellular carriers, provide for presentation a prompt requesting a confirmation that the mobile device wishes to join a network of the one of the two or more cellular carriers; and
based on receipt of the confirmation, initiate the one or more base feature services of the mobile device,
the base feature services including minimum services provided by the mobile device.

12. A method, comprising:
detecting, by a processor of a mobile device, removal of a first universal integrated circuit card from an interface of the mobile device, wherein the first universal integrated circuit card is associated with a cellular carrier;
detecting, by the processor, insertion of a second universal integrated circuit card into the interface;
accessing, by the processor, a file stored by the second universal integrated circuit card to retrieve a cellular carrier identifier associated with the second universal integrated circuit card;

determining, by the processor and based on the cellular carrier identifier, that the second universal integrated circuit card is not associated with the cellular carrier;

disabling, by the processor and based on determining that the second universal integrated circuit card is not associated with the cellular carrier, one or more proprietary feature services and one or more proprietary applications associated with the cellular carrier on the mobile device;

converting, by the processor and based on determining that the second universal integrated circuit card is not associated with the cellular carrier, data generated by the one or more proprietary feature services or the one or more proprietary applications into a non-proprietary format; and identifying, by the processor and in a memory of the mobile device, one or more base feature services and one or more non-proprietary applications; and enabling, by the processor, the one or more base feature services and the one or more non-proprietary applications for the mobile device, the one or more base feature services and the one or more non-proprietary applications being capable of utilizing the data in the non-proprietary format.

13. The method of claim 12, further comprising:
storing files for executing the one or more proprietary applications, associated with the cellular carrier, in a memory location of the mobile device that is inaccessible to a user of the mobile device or to another cellular carrier.

14. The method of claim 12, further comprising:
accessing, based on the cellular carrier identifier, a table of cellular carrier identifiers in a memory of the mobile device, the table including a plurality of cellular carrier identifiers; and comparing the cellular carrier identifier to the table of cellular carrier identifiers in order to determine that the second universal integrated circuit card is not associated with the cellular carrier.

15. The method of claim 12, further comprising:
changing a setting in a boot up procedure to indicate a memory address of the mobile device for installation of the one or more base feature services and the one or more non-proprietary applications.

16. The method of claim 12, further comprising:
determining that the second universal integrated circuit card is associated with another cellular carrier;
transmitting, based on a content address provided in the file, a request to a server in a network associated with the other cellular carrier; and
receiving, after transmitting the request, firmware and proprietary software associated with the other cellular carrier.

17. A non-transitory computer-readable medium storing instructions, the instructions comprising:
one or more instructions that, when executed by one or more processors of a mobile device, cause the one or more processors to:
establish, via an interface, an electrical contact with a universal integrated circuit card;
store proprietary feature services and proprietary applications associated with two or more cellular carriers;
determine that a first universal integrated circuit card inserted into the interface is associated with one of the two or more cellular carriers;
enable, based on the first universal integrated circuit card being associated with the one of the two or more cellular carriers, one or more proprietary feature services, of the proprietary feature services, associated with the one of the two more cellular carriers, and one or more proprietary applications, of the proprietary applications, associated with the one of the two more cellular carriers;
detect removal of the first universal integrated circuit card from the interface;
determine that a second universal integrated circuit card, inserted into the interface subsequent to the removal of the first universal integrated circuit card from the interface, is not associated with the two or more cellular carriers;
disable, based on determining that the second universal integrated circuit card is not associated with the two or more cellular carriers, the one or more proprietary feature services and the one or more proprietary applications;
convert, based on determining that the second universal integrated circuit card is not associated with the two or more cellular carriers, data generated by the one or more proprietary feature services or the one or more proprietary applications into a non-proprietary format; and
enable, based on the second universal integrated circuit card not being associated with the two or more cellular carriers, one or more base feature services and one or more non-proprietary applications,
the one or more base feature services and the one or more non-proprietary applications being capable of utilizing the data in the non-proprietary format.

18. The non-transitory computer-readable medium of claim 17, where the instructions further comprise:
one or more instructions that, when executed by the one or more processors, cause the one or more processors to:
receive customized firmware, associated with a user of the mobile device, based on an identifier of the mobile device.

19. The non-transitory computer-readable medium of claim 18, where the instructions further comprise:
one or more instructions that, when executed by the one or more processors, cause the one or more processors to:
receive a confirmation message confirming delivery of the customized firmware.

20. The non-transitory computer-readable medium of claim 18, where the customized firmware includes proprietary firmware and information about the one or more proprietary applications associated with the one of the two or more cellular carriers.

* * * * *